(12) United States Patent
Cnop et al.

(10) Patent No.: US 9,662,609 B2
(45) Date of Patent: May 30, 2017

(54) PROCESSES FOR COOLING A WET NATURAL GAS STREAM

(71) Applicant: UOP LLC, Des Plaines, IL (US)

(72) Inventors: Tom Cnop, Brussels (BE); Seow Ching Ng, Selangor (MY)

(73) Assignee: UOP LLC, Des Plaines, IL (US)

( * ) Notice: Subject to any disclaimer, the term of this patent is extended or adjusted under 35 U.S.C. 154(b) by 164 days.

(21) Appl. No.: 14/686,434

(22) Filed: Apr. 14, 2015

(65) Prior Publication Data

US 2016/0303506 A1    Oct. 20, 2016

(51) Int. Cl.
*B01D 53/22* (2006.01)
*B01D 53/04* (2006.01)
*B01D 53/26* (2006.01)
*C10L 3/10* (2006.01)

(52) U.S. Cl.
CPC ......... *B01D 53/229* (2013.01); *B01D 53/261* (2013.01); *C10L 3/101* (2013.01); *C10L 3/106* (2013.01); *C10L 3/107* (2013.01); *B01D 53/0462* (2013.01); *B01D 2256/245* (2013.01); *B01D 2257/304* (2013.01); *B01D 2257/504* (2013.01); *B01D 2257/602* (2013.01); *B01D 2257/702* (2013.01); *B01D 2257/80* (2013.01); *C10L 2290/06* (2013.01); *C10L 2290/542* (2013.01); *C10L 2290/548* (2013.01)

(58) Field of Classification Search
CPC .. B01D 53/0462; B01D 53/22; B01D 53/229; B01D 53/261; B01D 2256/245; B01D 2257/504; B01D 2257/702; B01D 2257/80; C10L 3/101; C10L 3/104; C10L 3/106; C10L 3/107
See application file for complete search history.

(56) References Cited

U.S. PATENT DOCUMENTS

| | | | | |
|---|---|---|---|---|
| 3,324,626 A * | 6/1967 | Dresser et al. | ........... | F25J 3/061 95/39 |
| 5,034,025 A * | 7/1991 | Overmann, III | ....... | B01D 53/22 95/52 |
| 5,352,272 A * | 10/1994 | Moll | ...................... | B01D 53/22 96/14 |
| 5,588,308 A | 12/1996 | Daugherty et al. | | |
| 5,762,685 A * | 6/1998 | Baker | .................. | B01D 53/229 95/288 |

(Continued)

FOREIGN PATENT DOCUMENTS

WO    WO 2012/050816 A3    4/2012

OTHER PUBLICATIONS

Villasin et al., "Heat Exchanger Networks," CHE 396 Senior Design—Paper, Orbit Publishing, 1-34.

(Continued)

*Primary Examiner* — Jason M Greene

(57) ABSTRACT

One or more processes to cool a wet natural gas feed stream before the feed stream is passed to a guard bed zone for a membrane separation unit. The processes utilizing an existing processes stream that has a temperature below the hydrate formation temperature of the feed stream. The existing stream may be a residue stream from the membrane separation unit which is heat exchanged with a cleaned stream from the guard bed zone. The cooled clean stream may then be used to cool the wet feed stream.

18 Claims, 2 Drawing Sheets

(56) References Cited

U.S. PATENT DOCUMENTS

Figure 1:
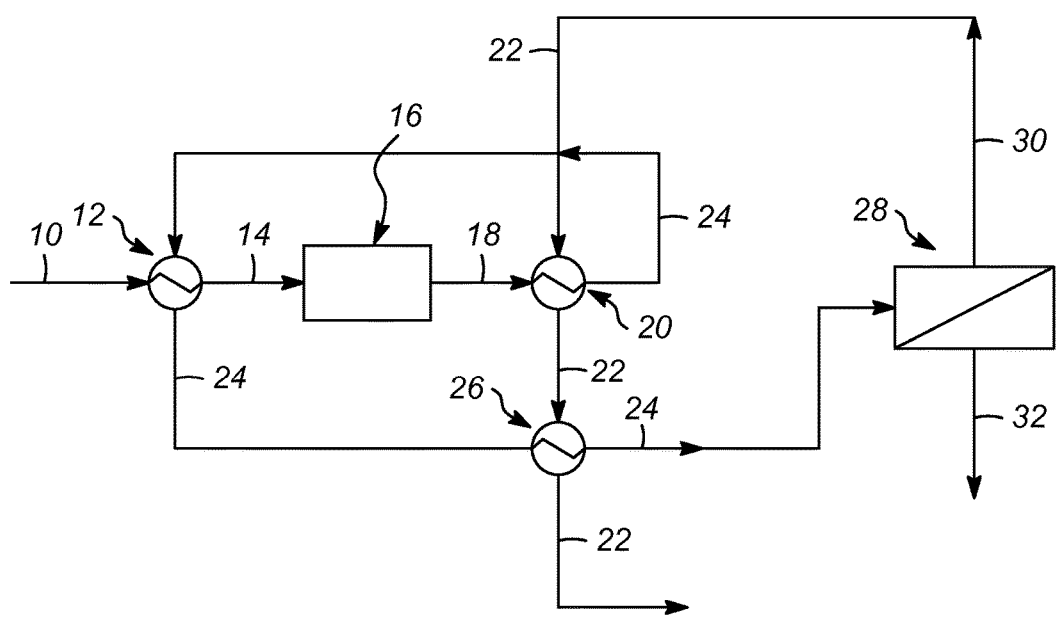

| | | | |
|---|---|---|---|
| 6,053,965 A * | 4/2000 | Lokhandwala | B01D 53/229 95/49 |
| 6,250,244 B1 | 6/2001 | Dubar et al. | |
| 6,572,678 B1 * | 6/2003 | Wijmans | B01D 53/226 95/47 |
| 7,803,215 B2 | 9/2010 | Russell et al. | |
| 7,989,511 B2 | 8/2011 | Casey et al. | |
| 8,083,834 B2 | 12/2011 | Zhou et al. | |
| 8,528,360 B2 * | 9/2013 | Betting | F25J 3/0209 62/5 |
| 2010/0122552 A1 * | 5/2010 | Schwartz | B01D 53/22 62/617 |
| 2011/0239700 A1 * | 10/2011 | Hasse | B01D 53/229 62/617 |
| 2013/0206672 A1 | 8/2013 | Harness et al. | |
| 2014/0224118 A1 | 8/2014 | Zhou et al. | |
| 2015/0090117 A1 * | 4/2015 | Baggerud | B01D 53/22 95/30 |
| 2015/0300734 A1 * | 10/2015 | Davidian | B01D 53/229 62/624 |

OTHER PUBLICATIONS

Echt et al., "Integration of Membranes into Natural Gas Process Schemes," Case Study—UOP LLC (2008), 1-15.

Dortmundt et al., "Recent Developments in CO2 Removal Membrane Technology," Paper—UOP LLC (1999), Des Plaines, Illinois, 1-32.

* cited by examiner

PROCESSES FOR COOLING A WET NATURAL GAS STREAM

FIELD OF THE INVENTION

The present invention relates to a process for removing heavy hydrocarbons and water from natural gas. More particularly, the invention relates to an efficient design to remove heavy hydrocarbons and water even when the natural gas contains high levels of carbon dioxide or hydrogen sulfide.

BACKGROUND OF THE INVENTION

A large fraction of the world's total natural gas reserves requires treating before it can be transported or used as feed stock or fuel gas. The presence of hydrogen sulfide is problematic as it is both highly toxic and tends to embrittle steel pipelines. The presence of water can present transportation problems and in combination with carbon dioxide, lead to corrosion issues. The presence of heavy hydrocarbons can result in condensation issues and a too high heating value. Other natural gas reserves are poor in quality because the methane and other combustible gas components are diluted with non-combustible carbon dioxide and nitrogen gas, making the unrefined gas a relatively low Btu fuel source.

If the natural gas deposits contain high percentages of carbon dioxide and hydrogen sulfide, the gas is considered both poor and sour. In order to provide usable natural gas, it is known to remove the carbon dioxide and hydrogen sulfide by membrane or absorption processes. The natural gas intended to be treated by means of the method according to the invention may be saturated with water and hydrocarbons. This natural gas is generally at the pressure and at the temperature of the production well or of any process used upstream.

Natural gas usually contains a significant amount of carbon dioxide. The proportion of carbon dioxide can range up to 70% by mole or higher, often from 5 to 40% by mole. A typical sour natural gas can, for example, contain 50 to 70% by mole of methane, 2 to 10% by mole of ethane, 0 to 5% by mole of propane, 0 to 20% by mole of hydrogen sulfide and 0 to 30% by mole of carbon dioxide. By way of example, the natural gas to be treated can contain 70% by mole of methane, 2% by mole of ethane, 0.7% by mole of propane, 0.2% by mole of butane, 0.7% by mole of hydrocarbons with more than four carbon atoms, 0.3% by mole of water, 25% by mole of carbon dioxide, 0.1% by mole of hydrogen sulfide and various other compounds as traces.

There are a number of different methods that have been used to treat natural gas streams. In most methods, a combination of technologies is employed to remove condensable components as well as gaseous components such as carbon dioxide. In one process, adsorbents are used to remove heavy hydrocarbons. In another process refrigeration is used to remove heavy hydrocarbons. In yet another process an amine solvent is used to remove carbon dioxide and hydrogen sulfide. Another particularly useful method involves permeable membrane processes and systems that are known in the art and have been employed or considered for a wide variety of gas and liquid separations. In such operations, a feed stream is brought into contact with the surface of a membrane, and the more readily permeable component of the feed stream is recovered as a permeate stream, with the less-readily permeable component being withdrawn from the membrane system as a non-permeate stream.

Membranes are widely used to separate permeable components from gaseous feed streams. Examples of such process applications include removal of acid gases from natural gas streams, removal of water vapor from air and light hydrocarbon streams, and removal of hydrogen from heavier hydrocarbon streams. Membranes are also employed in gas processing applications to remove permeable components from a process gas stream.

Membranes for gas processing typically operate in a continuous manner, wherein a feed gas stream is introduced to the membrane gas separation module on a non-permeate side of a membrane. In most natural gas membrane applications, the feed gas is introduced at separation conditions which include a separation pressure and temperature which retains the components of the feed gas stream in the vapor phase, well above the dew point of the gas stream, or the temperature and pressure condition at which condensation of one of the components might occur. The feed gas stream fed to the gas separation membrane may contain a substantial amount of moisture and condensable hydrocarbons. These condensable components can cause problems in downstream equipment, such as condensation in the membrane elements, thereby causing membrane swelling, or coating of the membrane surface, leading to decreased permeability. In order to compensate for the performance reduction caused by condensation of the feed gas stream during the lifetime of a membrane system, such membrane systems are often oversized to compensate for the loss of membrane surface over the useful life of the membrane. However, for high volume gas treating application, this over design of membrane capacity can be very costly, increasing the cost of a membrane system.

In order to provide optimal conditions for membrane operation and extend the membrane life, various processes pretreat the natural gas prior to sending it to the gas separation membrane. One such pretreatment process uses a thermal swing adsorption (TSA). These TSA units use aluminosilicate type adsorbents to remove heavier hydrocarbons and water from the natural gas. Additionally, mercury and other contaminants can be removed with such a pretreatment unit too. This pretreatment prevents condensation in the membrane process and the subsequent coating of the membrane surface with heavy hydrocarbons, thereby extending membrane life. The removal of components in the pretreatment may also contribute in meeting the downstream product specification of the natural gas stream.

In order to control the size of the pretreatment unit, the temperature of the wet feed gas entering the pretreatment unit is typically first cooled from, for example, between 40 to 45° C. (104 to 113° F.) down to about 15 to 20° C. (59 to 68° F.) (which is 5° C. (9° F.) above the hydrate formation temperature associated with the hydrocarbons) to allow liquid water and hydrocarbons to be separated from the gas stream that is routed to the TSA unit. If the wet feed stream is cooled to the hydrate formation temperature, hydrates may form in the heat exchanger and foul same or damage downstream equipment. The cooling may be accomplished by externally chilling the wet feed gas, or by exchanging heat between the wet feed gas and other gas streams, or by a combination of the two. As will be appreciated the use of external chilling requires equipment and increases the operating cost for a processor. Additionally, the limit of the hydrate formation temperature has been a limit to the existing streams that have typically been cross exchanged with the wet gas feed.

Therefore, it would be desirable for one or more effective and efficient processes that utilize existing low temperature gas streams to cool a feed gas to a membrane guard unit.

SUMMARY OF THE INVENTION

One or more processes have been invented for cooling a feed stream to a membrane guard bed unit, in which a lower temperature gas stream is utilized to cool the feed stream. By utilizing an existing stream, there is no need to provide an external cooling stream, and thus, less equipment and lower utility consumption may be appreciated.

Accordingly, in a first aspect of the present invention, the present invention may be broadly characterized as providing a process for removing compounds from a natural gas stream to provide a feed stream for a membrane separation unit by: removing heat from a wet feed stream to provide a cooled wet feed stream; separating water and heavy hydrocarbons from the cooled wet feed stream to provide a cleaned feed stream; and, removing heat from the cleaned feed stream to provide a cooled cleaned feed stream. The heat is removed from the cleaned feed stream by a cooling stream having a temperature below a hydrate formation temperature for the wet feed stream. The cooled cleaned feed stream, which has a temperature above the hydrate formation temperature for the wet feed stream, is used to remove heat from the wet feed stream. In addition, heat exchanger wall temperature of the cold stream also has to be above the hydrate formation temperature of the wet feed stream.

In one or more embodiments of the present invention, the process includes separating carbon dioxide from the cooled cleaned feed stream in a membrane separation unit to provide a carbon dioxide lean stream. It is contemplated that the carbon dioxide lean stream comprises the cooling stream.

In at least one embodiment of the present invention, the cooling stream has a temperature between −15 to 15° C. (5 to 59° F.).

In some embodiments of the present invention, the process includes removing heat from the cooled cleaned feed stream after the cooled cleaned feed stream has removed heat from the wet feed stream. It is contemplated that the cooling stream removes heat from the cooled cleaned feed stream after the cooled cleaned feed stream has removed heat from the wet feed stream.

In one or more embodiments of the present invention, the process further includes combining a portion of the cleaned feed stream with the cooled cleaned feed stream, after the cooled cleaned feed stream has removed heat from the wet feed stream.

In various embodiments of the present invention, the process includes the separation of water and heavy hydrocarbons from the cooled wet feed stream in a phase separation vessel as a liquid stream. It is contemplated that water and heavy hydrocarbons are further separated from the cooled wet feed stream in a separation zone. It is further contemplated that the separation zone comprises a portion of a thermal swing adsorption unit including at least one an adsorption vessel having an adsorbent.

In a second aspect of the present invention, the present invention may be characterized as providing a process for removing compounds from a natural gas stream to provide a feed stream for a membrane separation unit by: passing a wet feed stream to a first heat exchange zone to remove heat from the wet feed stream and to provide a cooled wet feed stream; separating water and heavy hydrocarbons from the cooled wet feed stream in a guard bed zone to provide a cleaned feed stream; passing the cleaned feed stream to a second heat exchange zone to remove heat from the cleaned feed stream with a cooling stream and to provide a cooled cleaned feed stream; and, passing the cooled cleaned feed stream to the first heat exchange zone to remove heat from the wet feed stream. The cooling stream heat exchanger wall temperature may have a temperature below a hydrate formation temperature for the wet feed stream. So, both heat exchanger wall temperature and cooling stream temperature have to be above the hydrate formation temperature of the wet feed stream.

In some embodiments of the present invention, the process includes passing the cooled cleaned feed stream from the first heat exchange zone to a third heat exchange zone to remove heat from the cooled cleaned feed stream. It is contemplated that the process includes passing the cooling stream from the second heat exchange zone to the third heat exchange zone. It is also contemplated that the process includes passing the cooled cleaned feed stream from the third heat exchange zone to a membrane separation zone. It is further contemplated that the cooling stream is passed from the membrane separation zone to the second exchange zone.

In one or more embodiments of the present invention, the first heat exchange zone comprises a heat exchanger and the third heat exchange zone comprises a heat exchanger. It is contemplated that the heat exchanger in the first heat exchange zone and the heat exchanger in the third heat exchange zone may be formed into a single unit. It is also contemplated that the heat exchanger in the first heat exchange zone and the heat exchanger in the third heat exchange zone are separated.

In various embodiments of the present invention, the cooling stream comprises a gaseous stream from a membrane separation zone.

In at least one embodiment of the present invention, the guard bed zone comprises a thermal swing adsorption unit. It is contemplated that the thermal swing adsorption unit includes a phase separation vessel.

Additional aspects, embodiments, and details of the invention, which may be combined in any manner, are set forth in the following detailed description of the invention.

DETAILED DESCRIPTION OF THE DRAWINGS

Figure 2:
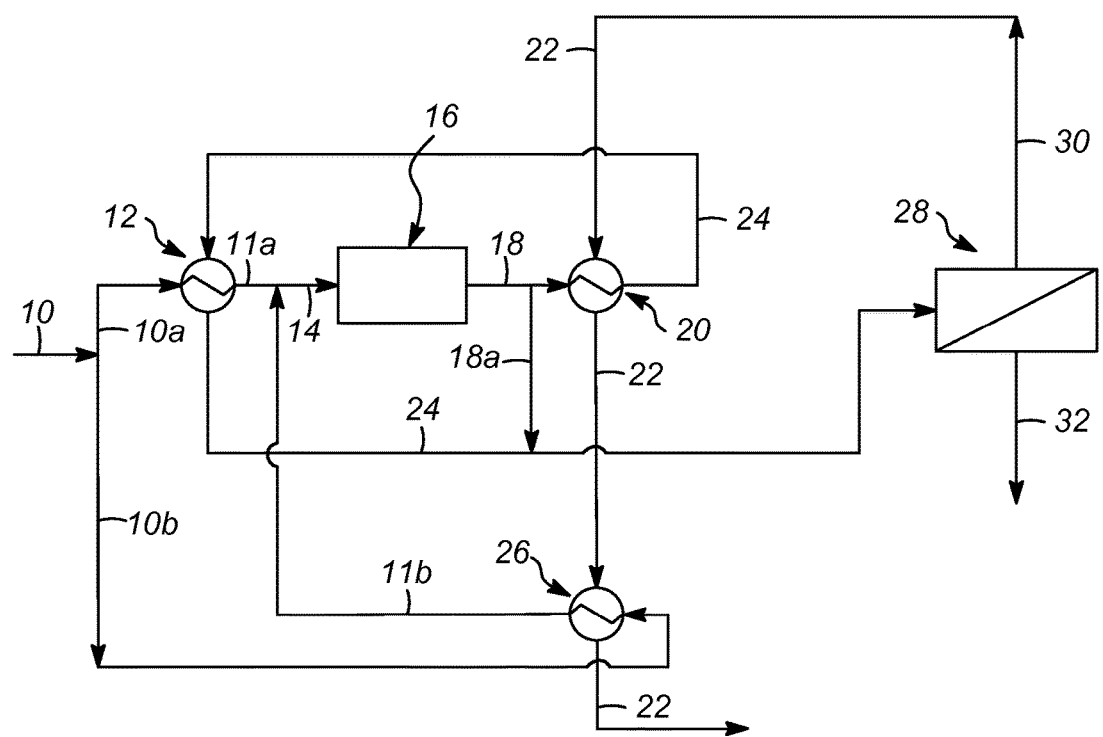

One or more exemplary embodiments of the present invention will be described below in conjunction with the following drawing figures, in which:

FIG. 1 shows a process flow diagram of one or more processes according to the present invention; and, FIG. 2 shows another process flow diagram of one or more processes according to the present invention.

DETAILED DESCRIPTION OF THE INVENTION

As mentioned above, one or more processes have been invented for cooling a feed stream to a membrane guard bed unit, in which a low temperature gas stream is utilized to cool the feed stream. By first cooling the feed stream, the guard bed unit can be smaller. Additionally, by using an existing stream, the processes may lead to utility savings as the process may not require an external cooling. In systems which process feeds having a very high carbon dioxide amounts (e.g., 20% carbon dioxide or greater), the residue gas is very cold (approximately 5° C. (41° F.)). However, such a low temperature is below the hydrate formation temperature (typically between 10° C. and 15° C. (50 and 59° F.)) of the wet feed stream. Thus, the use of such a stream may lead to the formation of hydrates in the heat exchanger as the tube temperature is lower than the hydrate formation temperature of the wet feed gas. However, by utilizing an intermediary stream, the low temperature residue stream may be used as the cooling stream. In addition to the intermediary stream, a portion of the feed steam may also be cooled by the cooling stream, but after the cooling stream has cooled the intermediary stream.

With these general principles in mind, one or more embodiments of the present invention will be described with the understanding that the following description is not intended to be limiting.

As shown in FIG. 1, in various embodiments of the present invention, a wet feed stream 10 is cooled in a first heat exchange zone 12 to provide a cooled wet feed stream 14. The wet feed stream 10 comprises a natural gas stream including hydrocarbons such as methane and other gaseous compounds including water, carbon dioxide, hydrogen sulfide and the like. Accordingly, if the temperature of the cooled wet feed stream 14 is too low (typically less than 15° C. (59° F.)), hydrates can form in the line and cause fouling in the heat exchange zone 12 and damage downstream equipment.

Typically, the wet feed stream 10 is cooled via an external chilling, cross exchanging with other streams, or a combination of both. The use of an external chilling increases utility costs and may require additional equipment. Similarly, cross exchanging with existing streams may not provide as low a temperature that is desired. As will be explained in more detail, the present invention utilizes an existing stream to cool the wet feed stream 10 in a surprising and unconventional manner, as the existing stream may often have a temperature that is below the hydrate formation temperature of the wet feed stream 10.

Returning to FIG. 1, the cooled wet feed stream 14 is passed to a separation zone or a guard bed zone 16 being configured to separate water and heavy hydrocarbons from the cooled wet feed stream 14 to provide a cleaned feed stream 18. The guard bed zone 16 may include an adsorbent in a vessel or a plurality of vessels configured as a temperature swing adsorption unit (TSA) which is known in the art as disclosed for example in U.S. Pat. No. 7,803,215, the entirety of which is incorporated herein by reference. In addition to removing water and heavy hydrocarbons, some guard bed zones 16 may also remove mercury and hydrogen sulfide, depending on the adsorbents contained therein. In addition, in the alternative, or both, the guard bed zone 16 may comprise a phase separation vessel. Instead of a TSA, the guard bed zone may utilize glycol absorption or a supersonic separator such as the Twister™.

From the guard bed zone 16, the cleaned feed stream 18 is cooled in a second heat exchange zone 20 with a cooling stream 22 to provide a cooled cleaned feed stream 24. The cooling stream 22 has a temperature that is preferably between −15 to 15° C. (5 and 59° F.), or between 0 to 5° C. (32 and 41° F.), and most preferably comprises an existing process stream. A preferred source for the cooling stream 22 is discussed herein below. Since water has been removed in the guard bed zone 16, there is no possibility for the formation of hydrates within the stream. Therefore, the cleaned stream 18 can be heat exchanged with the cooling stream 22 having a temperature below the hydrate formation temperature of the wet feed stream 10.

The cooled cleaned feed stream 24 is passed to the first heat exchange zone 12 to cool the wet feed stream 10. After the cooled cleaned feed stream 24 has removed heat from the wet feed stream 10 in the first heat exchange zone 12, the cooled cleaned feed stream 24 may be exchanged once again with the cooling stream 22 in a third heat exchange zone 26 (and after the cooling stream 22 has cooled the cleaned feed stream 18 in the second heat exchange zone 20). From the third heat exchange zone 26, the cooled cleaned feed stream 24 may be passed to a membrane separation unit 28, which is discussed in more detail below.

Each of the heat exchange zones 12, 20, 26 preferably comprises one or more heat exchangers, such as tube in shell, plate and frame, hairpin, radial heat exchangers, or compact diffusion bonded printed circuit heat exchangers. It is contemplated that one or more of the heat exchangers are formed into a single unit. In other words, the heat exchanger may be a single unit with a single housing facilitating the cross exchange of heat between a plurality of sets of streams. For example, in some embodiments, the heat exchanger in the first heat exchange zone 12 and the heat exchanger in the third heat exchange zone 26 may be combined. In other embodiments, the heat exchanger in the second heat exchange zone 20 and the heat exchanger in the third heat exchange zone 26 may be combined. In still a further embodiment, the heat exchanger in the first heat exchange zone 12 and the heat exchanger in the third heat exchange zone 26 may be combined. In at least one embodiment, all three heat exchanges in the heat exchange zones 12, 20, 26 may be combined. Such heat exchangers are known in the art.

As shown in FIG. 1, the membrane separation unit 28 utilizes a membrane to remove the carbon dioxide from the cooled cleaned feed stream 24 and provide a residue stream 30 comprising the desired hydrocarbons, as well as other gaseous not yet removed—for example nitrogen in some cases. Additionally, a permeate stream 32 from the membrane separation unit will be rich in carbon dioxide (compared to the cooled cleaned feed stream 24). The further processing of the permeate stream 32 is not necessary for the understanding of the present invention. The configuration of the membrane separation unit 28 is not necessarily important to the present invention. Exemplary membrane separation units 28 are described in U.S. Pat. Pub. No. 2013/0206672 and WO 2012/050816, the entirety of both of which are incorporated herein by reference. Additionally, an exemplary membrane is disclosed in U.S. Pat. No. 8,083,834, the entirety of which is incorporated herein by reference. The amount of carbon dioxide in the wet feed stream 10, and more particularly the cooled cleaned feed stream 24 will have an impact on the temperature of the residue stream 30 from the membrane separation unit 28. More particularly, the more carbon dioxide in the wet feed stream 10, the lower the residue stream 30 temperature will be. For example, if the amount of carbon dioxide in the wet feed stream 10 is about 25%, the resulting residue stream 30 may have a temperature of approximately 5° C. (41° F.). Thus, this temperature is below the hydrate formation temperature associated with the wet feed stream 10. However, it has been discovered that by utilizing the cooled cleaned feed stream 24 as an intermediary stream, the residue stream 30, with a temperature below that of hydrate formation temperature of the wet feed stream 10, can be used to cool the wet feed stream 10 without cooling it below the hydrate formation temperature. Thus, as shown in the Figure, the residue stream 30 can be used as the cooling stream 22, discussed above, which cools the cleaned feed stream 18 to form the cooled cleaned feed stream 24. After exchanging heat in the third heat exchange zone 26, the residue stream 30 (as the cooling stream 22) may be processed further to remove other components, or exported.

Turning to FIG. 2, in various embodiments of the present invention, similar elements are denoted with the same reference numerals as discussed in regards to the embodiment discussed in FIG. 1.

In FIG. 2, the wet feed stream 10 is split into at least two portions, and a first portion 10a is passed to the first heat exchange zone 12 to form a first cooled wet feed stream 11a. The second portion 10b is passed to the third heat exchange zone 26 to form a second cooled wet feed stream 11b. The second cooled wet feed stream 11b may be combined with the first cooled wet feed stream 11a to form the cooled wet feed stream 14 which is passed to the guard bed zone 16.

At least a portion of the cleaned feed stream 18 form the guard bed zone 16 is cooled in the second heat exchange zone 20, by the cooling stream 22, to form the cooled cleaned feed stream 24. After, the cooled cleaned feed stream 24 is passed to the first heat exchange zone 12 to cool the first portion 10a of the wet feed stream 10, the cooled cleaned feed stream 24 may be passed to the membrane separation unit 28. As depicted in FIG. 2, a second portion 18a of the cleaned feed stream 18 may be combined with the cooled cleaned feed stream 24 without passing to the second heat exchange zone 20.

In comparison with the process depicted in the FIG. 1, the process depicted in FIG. 2 should have less pressure drop as the amount of process fluids passed to the various heat exchanges zones is less. This will also allow for smaller heat exchangers in the various heat exchanges zones. Again, two or more of the heat exchanges from the various heat exchange zones may be combined.

Other modifications may be made to the depicted embodiments to practice the principles of the present invention.

In a theoretical modeling to demonstrate the principles of the present invention, cooling streams with a temperature between 5 and 6° C. (41 and 43° F.) (i.e., a residue stream associated with a high carbon dioxide feed) was used to cool a feed stream with a temperature of 40° C. (104° F.). The various temperatures are shown in the below table, Table 1.

TABLE 1

| Stream (ref no. from the Figures) | FIG. 1 Temperature | FIG. 2 Temperature |
|---|---|---|
| wet feed stream (10) | 40.0° C. (104° F.) | 40.0° C. (104° F.) |
| cooled wet feed stream (14) | 22.9° C. (73.2° F.) | 22.4° C. (72.3° F.) |
| cleaned feed stream (18) | 25.3° C. (77.5° F.) | 25.8° C. (78.4° F.) |
| cooled cleaned feed stream (24) | 16.5° C. (61.7° F.) | 14.0° C. (57.2° F.) |
| cooled cleaned feed stream (24) after the first heat exchange zone (12) (and before third heat exchange zone (26) in FIG. 1) | 37.6° C. (99.7° F.) | 24.7° C. (76.5° F.) |
| cooled cleaned feed stream (24) after third heat exchange zone (26) | 25.0° C. (77° F.) | |
| cooling stream (22) | 5.6° C. (42.1° F.) | 5.2° C. (41.4° F.) |
| cooling stream (22) between second heat exchange zone (20) and third heat exchange zone (26) | 17.8° C. (64.0° F.) | 17.6° C. (63.7° F.) |
| cooling stream (22) after third heat exchange zone (26) | 35.8° C. (96.4° F.) | 36.1° C. (97.0° F.) |

Thus, an existing stream having a temperature below the hydrate formation temperature may be utilized a cooling stream for a pretreatment of a feed to a membrane separation unit in accordance with the various embodiments as aspects of the present invention. By utilizing the existing stream, there is less reliance on external cooling to ensure that the guard bed is operating efficiently. Thus, the use of the existing stream is made possible even if the existing stream is a low temperature stream that has a temperature below the hydrate formation temperature of the wet feed stream.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for removing compounds from a natural gas stream to provide a feed stream for a membrane separation unit, the process comprising:
    removing heat from a wet feed stream to provide a cooled wet feed stream;
    separating water and heavy hydrocarbons from the cooled wet feed stream to provide a cleaned feed stream; and,
    removing heat from the cleaned feed stream to provide a cooled cleaned feed stream, wherein heat is removed from the cleaned feed stream by a cooling stream having a temperature below a hydrate formation temperature for the wet feed stream, and wherein the cooled cleaned feed stream is used to remove heat from the wet feed stream; and
    separating carbon dioxide from the cooled cleaned feed stream in a membrane separation unit to provide a carbon dioxide lean stream; wherein the carbon dioxide lean stream comprise the cooling stream.

2. The process of claim 1 wherein the cooling stream has a temperature between −15 to 15° C. (5 to 59° F.).

3. The process of claim 1 further comprising:
    removing heat from the cooled cleaned feed stream after the cooled cleaned feed stream has removed heat from the wet feed stream.

4. The process of claim 1 further comprising:
    combining a portion of the cleaned feed stream with the cooled cleaned feed stream, after the cooled cleaned feed stream has removed heat from the wet feed stream.

5. The process of claim 1 wherein water and heavy hydrocarbons are separated from the cooled wet feed stream in a phase separation vessel as a liquid stream.

6. The process of claim 5 wherein water and heavy hydrocarbons are further separated from the cooled wet feed stream in a separation zone.

7. The process of claim 6 wherein the separation zone includes a thermal swing adsorption unit having at least one an adsorption vessel including an adsorbent.

8. A process for removing compounds from a natural gas stream to provide a feed stream for a membrane separation unit, the process comprising:
passing a wet feed stream to a first heat exchange zone to remove heat from the wet feed stream and to provide a cooled wet feed stream;
separating water and heavy hydrocarbons from the cooled wet feed stream in a guard bed zone to provide a cleaned feed stream;
passing the cleaned feed stream to a second heat exchange zone to remove heat from the cleaned feed stream with a cooling stream and to provide a cooled cleaned feed stream; and,
passing the cooled cleaned feed stream to the first heat exchange zone to remove heat from the wet feed stream,
wherein the cooling stream has a temperature below a hydrate formation temperature for the wet feed stream.

9. The process of claim 8 further comprising:
passing the cooled cleaned feed stream from the first heat exchange zone to a third heat exchange zone to remove heat from the cooled cleaned feed stream.

10. The process of claim 9 further comprising:
passing the cooling stream from the second heat exchange zone to the third heat exchange zone.

11. The process of claim 10 further comprising:
passing the cooled cleaned feed stream from the third heat exchange zone to a membrane separation zone.

12. The process of claim 11, wherein the cooling stream is passed from the membrane separation zone to the second exchange zone.

13. The process of claim 9 wherein the first heat exchange zone comprises a heat exchanger and the third heat exchange zone comprises a heat exchanger.

14. The process of claim 13 wherein the heat exchanger in the first heat exchange zone and the heat exchanger in the third heat exchange zone are formed into a single unit.

15. The process of claim 13 wherein the heat exchanger in the first heat exchange zone and the heat exchanger in the third heat exchange zone are separated.

16. The process of claim 8 wherein the cooling stream is comprises a gaseous stream from a membrane separation zone.

17. The process of claim 8 wherein the guard bed zone comprises a thermal swing adsorption unit.

18. The process of claim 17 wherein the thermal swing adsorption unit includes a phase separation vessel.

* * * * *